(12) United States Patent
Brownhill

(10) Patent No.: US 10,536,418 B2
(45) Date of Patent: Jan. 14, 2020

(54) SYSTEMS AND METHODS FOR PROVIDING CONTENT

(71) Applicant: Facebook, Inc., Menlo Park, CA (US)

(72) Inventor: Ryan Brownhill, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 320 days.

(21) Appl. No.: 15/365,810

(22) Filed: Nov. 30, 2016

(65) Prior Publication Data

US 2018/0150465 A1 May 31, 2018

(51) Int. Cl.
*H04L 12/58* (2006.01)
*H04L 29/08* (2006.01)
*H04L 29/06* (2006.01)

(52) U.S. Cl.
CPC .......... *H04L 51/32* (2013.01); *H04L 65/4076* (2013.01); *H04L 67/18* (2013.01)

(58) Field of Classification Search
CPC .......... G06F 17/30864; G06F 17/3053; G06Q 50/01; H04L 12/1822; H04L 51/32; H04L 65/4076; H04L 51/046; H04L 67/18
USPC ........................................................ 707/723
See application file for complete search history.

(56) References Cited

U.S. PATENT DOCUMENTS

| | | | | |
|---|---|---|---|---|
| 7,669,123 B2 * | 2/2010 | Zuckerberg | ....... | G06F 17/30867 715/273 |
| 8,065,628 B2 * | 11/2011 | Oshiro | .................. | G06F 3/0481 715/716 |
| 8,887,088 B2 * | 11/2014 | Oshiro | .................. | G06F 3/0481 715/716 |
| 8,938,089 B1 * | 1/2015 | Postelnicu | ......... | G06K 9/00744 382/100 |
| 2009/0089352 A1 * | 4/2009 | Davis | ..................... | G06Q 10/00 709/201 |
| 2009/0148124 A1 * | 6/2009 | Athsani | .................. | G06Q 30/02 386/241 |
| 2011/0116719 A1 * | 5/2011 | Bilobrov | ............ | G06K 9/00711 382/217 |
| 2013/0054645 A1 * | 2/2013 | Bhagavathy | ...... | G06F 17/30784 707/780 |
| 2013/0097642 A1 * | 4/2013 | Cragun | .............. | G06Q 30/0603 725/59 |
| 2013/0276033 A1 * | 10/2013 | Francini | ............. | H04N 5/44543 725/50 |
| 2014/0026201 A1 * | 1/2014 | Srinivasan | ............. | G06Q 50/01 726/7 |
| 2014/0279068 A1 * | 9/2014 | Systrom | ............. | G06Q 30/0277 705/14.73 |

(Continued)

OTHER PUBLICATIONS

Tanaka, Atau, et al., "A Framework for Spatial Interaction in Locative Media", NIME 06, Paris, France, Jun. 4-8, 2006, pp. 26-30.*

*Primary Examiner* — Robert Stevens
(74) *Attorney, Agent, or Firm* — Sheppard Mullin Richter & Hampton LLP

(57) ABSTRACT

Systems, methods, and non-transitory computer-readable media can group a set of live content items based at least in part on the live content items satisfying at least one relatedness criteria, the live content items being broadcasted through the content provider system. The set of live content items is ranked. An interface that includes a content feed through which the ranked set of live content items are accessible is generated.

20 Claims, 7 Drawing Sheets

(56) References Cited

U.S. PATENT DOCUMENTS

2016/0080817 A1* 3/2016 Chai ................. H04N 21/4788
                                                          725/43
2019/0075341 A1* 3/2019 Koul ....................... G06K 9/00

* cited by examiner

SYSTEMS AND METHODS FOR PROVIDING CONTENT

FIELD OF THE INVENTION

The present technology relates to the field of content provision. More particularly, the present technology relates to techniques for providing content items.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to group a set of live content items based at least in part on the live content items satisfying at least one relatedness criteria, the live content items being broadcasted through the content provider system. The set of live content items is ranked. An interface that includes a content feed through which the ranked set of live content items are accessible is generated.

In some embodiments, the systems, methods, and non-transitory computer readable media are configured to determine live content items that are being broadcasted from a particular geographic location.

In some embodiments, the systems, methods, and non-transitory computer readable media are configured to determine live content items that correspond to a particular event.

In some embodiments, the event was created through the content provider system.

In some embodiments, a live content item is determined to correspond to the event based at least in part on the live content item being broadcasted by a user that is attending the event.

In some embodiments, the set of live content items are ranked based at least in part on a respective number of social engagement signals received for the live content items from users of the content provider system.

In some embodiments, the number of social engagement signals for a live content item include at least a count of users viewing the live content item during its broadcast, a number of likes received for the live content item from, a number of reactions received for the live content item, a number of comments received for the live content item, or a number of times the live content item has been shared by users.

In some embodiments, the systems, methods, and non-transitory computer readable media are configured to determine that a first live content item in the content feed is no longer being broadcasted and remove the first live content item from the content feed.

In some embodiments, the systems, methods, and non-transitory computer readable media are configured to determine that a new live content item being broadcasted satisfies the at least one relatedness criteria and add the new live content item to the content feed.

In some embodiments, the systems, methods, and non-transitory computer readable media are configured to provide the interface to a computing device of a user, determine that the user operating a computing device has accessed a first live content item in the content feed, and provide the first live content item broadcast to be presented on a display screen of the computing device.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
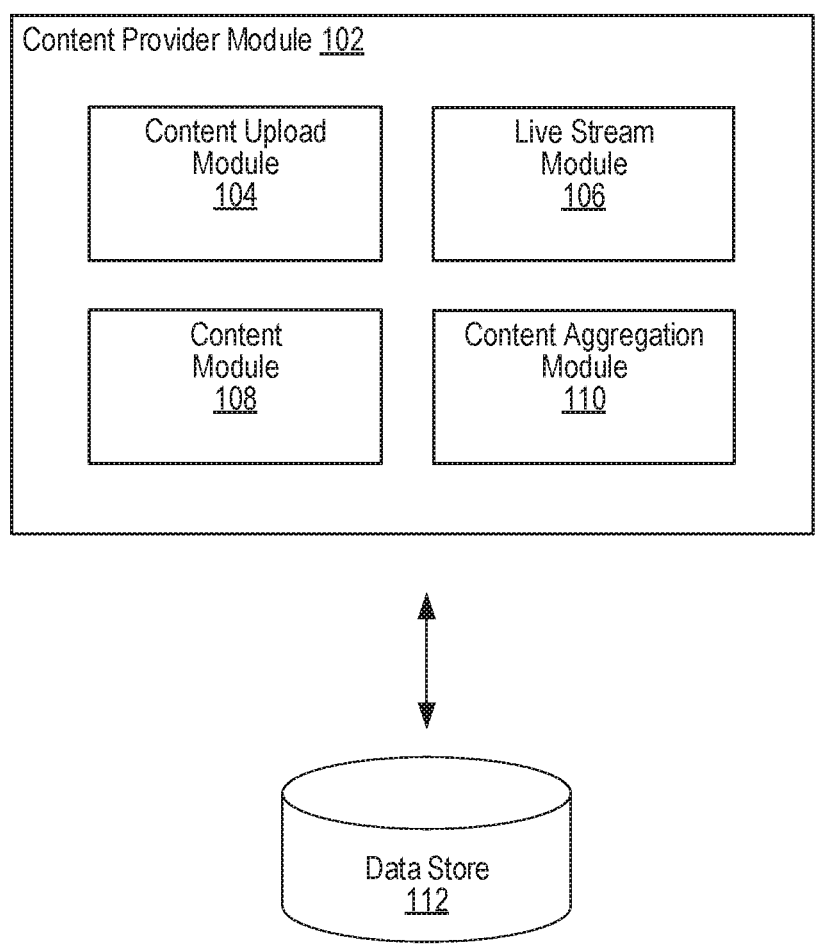
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Content

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users can access content through a content provider (e.g., social networking system). Such content may include content items that are stored by the content provider, for example, as on-demand content items (e.g., video on-demand or "VOD") as well as content items that are being broadcasted live (e.g., live content item or live content stream) through the content provider using various mediums (e.g., Internet broadcasting). In one example, a live content stream (or live content item) can include content that is being captured and streamed live by a user (e.g., a broadcaster). For example, the broadcaster can capture and stream an event (e.g., a live video of the broadcaster, concert, speech, etc.) as part of a live content stream. Such events can be captured using computing devices (e.g., mobile devices with audio and video capture capabilities) and/or standalone devices (e.g., video cameras and microphones). A user (e.g., a viewer) operating a computing device can access the live content stream through the content provider. In response, the content provider encodes and provides data corresponding to the live content stream to the user's computing device over a network (e.g., the Internet) in real-time. The computing device can decode and present the live content stream, for example, through a display screen of the computing device. In general, the live content stream continues to be provided to the user's computing device until the broadcaster discontinues broadcasting the live content stream or the user instructs the computing device to stop accessing the live content stream, for example. In general, there may be a plethora of content items that are available through the content provider for users to access. As a consequence, users may have difficulty locating relevant content items. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, the content provider (e.g., social networking system) is configured to aggregate (or group) live content items into respective sets of related content items. For example, in some embodiments, live content items being broadcast from the same, or similar, geographic location can be aggregated as a set of related live content items. These sets of related live content items can be made accessible to users through various interfaces. In general, related live content items may each provide different views of and/or commentary about some event. For example, a first live content stream capturing a first view (e.g., perspective, angle, etc.) of a concert may be made available through the content provider. Similarly, a second live content stream capturing a second view of the same concert may also be made available through the content provider. In this example, the content provider can aggregate the first live content stream and the second live content stream into a set of related content items. Both the first live content stream and the second live content stream can be made accessible through an interface provided by the content provider. A user interested in the concert can access either of these live content streams through the interface to watch the concert from different perspectives. Such aggregation of content items, therefore, improves the overall user experience and also the ease with which related content items can be accessed. While the foregoing example references two live content streams for ease of illustration, the present disclosure can apply to more than two live content streams, as discussed in more detail herein.

FIG. 1 illustrates an example system 100 including an example content provider module 102, according to an embodiment of the present disclosure. As shown in the example of FIG. 1, the content provider module 102 can include a content upload module 104, a live stream module 106, a content module 108, and a content aggregation module 110. In some instances, the example system 100 can include at least one data store 112. The components (e.g., modules, elements, etc.) shown in this figure and all figures herein are examples only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 112, as shown in the example system 100. The at least one data store 112 can be configured to store and maintain various types of data. For example, the data store 112 can store information describing various content that is being streamed live through the social networking system and/or on-demand content items (e.g., content items that have been posted by users of the social networking system). In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content provider module 102 can be configured to provide users with access to content items that are posted, or made available, through a content provider (e.g., social networking system). For example, a user can interact with an interface that is provided by a software application (e.g., a social networking application) running on a computing device of the user. This interface can be used to access various content items that are accessible through the content provider. In some instances, the content module 108 can include various content items in the user's news feed. Such content items may include on-demand content items as well as content that is being streamed live. In this example, the user can access content items while browsing the news feed. The content module 108 can also identify and provide content items that are responsive to search queries submitted through the interface. In some embodiments, this interface can include an option for posting, or uploading, content items to the social networking system. When posting a content item, the content upload module 104 can be utilized to communicate data corresponding to the content item from the computing device to the social networking system. Such content items may include text, images, audio, and videos, for example. The social networking system can then provide the content item through the social networking system including, for example, in one or more news feeds. In some embodiments, the interface can also include an option for live streaming content through the social networking system. When initiating a live content stream, the live stream module 106 can be utilized to communicate data (e.g., audio data, video data, etc.) corresponding to the content to be streamed live from the computing device and through the social networking system. The live stream module 106 can utilize any generally known techniques that allow for live streaming of content including, for example, the Real Time Messaging Protocol (RTMP). In various embodiments, the computing device from which the live content stream is being provided can be equipped to capture data (e.g., video data, audio data, etc.) corresponding to the live content stream.

In some embodiments, the content aggregation module 110 can aggregate live content items based on various relatedness criteria and these related live content items can be made accessible to users through various interfaces provided by the content provider module 102. More details regarding the content aggregation module 110 will be provided below with reference to FIG. 2.

Figure 2:
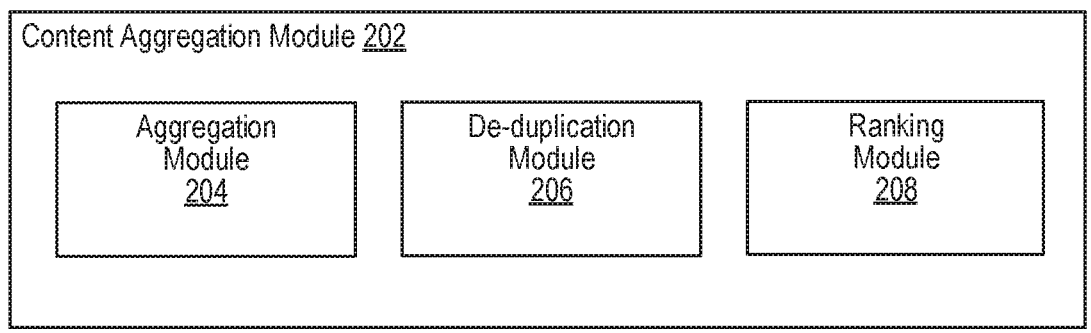
FIG. 2 illustrates an example of a content aggregation module, according to an embodiment of the present disclosure.

FIG. 2 illustrates an example of a content aggregation module 202, according to an embodiment of the present disclosure. In some embodiments, the content aggregation module 110 of FIG. 1 can be implemented as the content aggregation module 202. As shown in FIG. 2, the content aggregation module 202 can include an aggregation module 204, a de-duplication module 206, and a ranking module 208.

In various embodiments, the aggregation module 204 can aggregate (or group) live content items that are accessible through a content provider (e.g., social networking system). As mentioned, such content may include live content items that are being broadcasted live through the content provider using various communication mediums. In some instances, the live content items being aggregated may be curated algorithmically or human curators. In one example, a live content item can include content that is being captured and streamed live by a broadcasting user. For example, the broadcaster can capture and stream content (e.g., a live video of the broadcaster, concert, speech, etc.) as part of a live content item. Such content can be captured using computing devices (e.g., mobile devices with audio and video capture capabilities) and/or standalone devices (e.g., video cameras and microphones). A user (or viewer) operating a computing device can access the live content item through the content provider. In response, the content provider encodes and provides data corresponding to the live content item to the user's computing device over a network (e.g., the Internet) in real-time. The user's computing device can decode and present the live content item, for example, through a display screen of the computing device. In some embodiments, live content items are converted into respective on-demand content items (e.g., video on-demand or "VOD") once broadcasting ceases.

In some embodiments, when aggregating live content items, the aggregation module 204 identifies live content items that that are being broadcast from a shared geographic region or from geographic regions that are within a threshold distance of one another. For example, a broadcaster can capture and stream a live content item using a computing device. In some embodiments, when streaming the live content item through the content provider, the broadcaster's computing device can also provide geolocation information to the content provider. This geolocation information can be used to identify a geographic region (e.g., point of interest, city, zip code, state, country, continent, etc.) from which the content is being broadcast. In some embodiments, a software application (e.g., social networking application) running on the broadcaster's computing device may also provide such geolocation information to the content provider. In various embodiments, any generally known technique for geolocating devices can be utilized (e.g., GPS triangulation, Wi-Fi localization, etc.). The aggregation of content items by geographic region can vary in granularity depending on the implementation. In one example, content items being broadcast from the same point of interest (e.g., sports stadium) can be aggregated. These aggregated content items can be made accessible to users through an interface (e.g., graphical user interface) that is generated specifically for live content items that originate from the point of interest. For example, the interface can be provided through a software application running on a computing device being operated by a viewing user. The viewing user can interact with the interface to access content items, for example, by performing touch screen gestures through a display screen of the computing device. In some embodiments, user check-in data can be used to aggregate live content items. For example, users at a particular geographic location (e.g., point of interest) may check-in at the geographic location using their respective computing devices. When checking-in, a user may select an option through a software application (e.g., social networking application) running on the user's computing device to check-in at the geographic location. This check-in data can be received and stored by the content provider. In such embodiments, the check-in data can be used to identify live content items being broadcast from a given geographic location. These identified live content items can then be aggregated into respective sets of related live content items.

In some embodiments, when aggregating content items, the aggregation module 204 identifies live content items that that relate to a given event. In some embodiments, an event can correspond to any organized or impromptu gathering of users that occurs either physically or virtually (e.g., community meeting, national holidays, sporting events, online multi-user game, etc.). Such events may be identified in a number of ways. For example, in some embodiments, an organizer of a real-world event can create an event page through the content provider. Typically, the organizer can invite users of the content provider to attend the event. Invitees can opt to confirm their attendance by selecting an option through the content provider. In some embodiments, any live content items broadcast by attendees of the event can be aggregated. To ensure that only event-related streams are being aggregated, in some embodiments, the aggregation module 204 can verify that the broadcaster of a live content item has confirmed their event attendance, that the live content item is being broadcast from a geographic location that corresponds to the event, and that the broadcast is occurring during a specified time period for the event, to provide some examples.

Live content items corresponding to a given event can also be identified automatically based on information associated with the live content items. For example, in some embodiments, a broadcaster of a live content item can specify tags (e.g., hash tags) in the description section corresponding to the live content item (or in one or more comments corresponding to the live content item). In such embodiments, live content items that share one or more tags can be identified and aggregated into a set of related live content items.

In some embodiments, the de-duplication module 206 can remove any duplicate live content items that were aggregated into a set of related live content items. For example, the de-duplication module 206 can identify live content items that include a threshold amount of matching content (e.g., a threshold number of matching frames, a threshold duration over which content overlaps, etc.). In this example, only one of the identified live content items is retained in the set of related live content items. The remaining live content items that match the retained live content item are removed from the set. Depending on the implementation, the live content item being retained can be selected based on the broadcaster (or publisher) of the live content item, the popularity of the live content item as measured using one or more social engagement signals (e.g., number of likes, reactions, comments, shares, etc.), and/or the time at which the live content item was broadcast (e.g., the live content item to be broadcast first can be retained). More details describing the process for identifying matching live content items are described in U.S. patent application Ser. No. 15/290,999, filed Oct. 11, 2016, entitled "Systems and Methods for Identifying Matching Content", which is incorporated by reference herein.

In various embodiments, the ranking module 208 is configured to rank live content items that were aggregated into sets of related live content items. In some embodiments, the live content items are ranked amongst one another based on the respective number of viewers of the live content items. In such embodiments, the ranking module 208 can determine the respective number of viewers that are accessing each of the live content items through the content provider. These live content items can then be ranked based on the respective number of users viewing them. In some embodiments, the live content items are ranked based on the respective number of social engagement signals (or metrics) that were received for the live content items. For example, users viewing a live content item through the content provider may select one or more options to like the live content item, one or more options to react (e.g., happy, sad, angry, etc.) to the live content item, one or more options to post comments in response to the live content item, and/or one or more options to share the live content item with other users of the content provider, to name some examples. In such embodiments, these social engagement signals can be used, either alone or in combination, to rank the live content items in a set amongst one another. In one example, a first live content item that received a greater number of social engagement signals (e.g., likes) can be ranked higher than a second live content item that received a fewer number of social engagement signals. In some embodiments, certain ranking criteria can be weighted more heavily than others. For example, in some embodiments, the number of comments received for a live content item can be stronger indicia of the live content item's popularity than the number of users viewing the live content item. In this example, a first live content item that received more comments than a second live content item can be ranked higher than the second live content item despite the second live content item having more viewers. In some embodiments, the live content items can be ranked based on the respective broadcasters of the live content items. For example, certain users may be more popular than others (e.g., celebrities, frequent broadcasters, etc.). In this example, a live content item posted by a popular broadcaster can be ranked higher than live content items that were posted by less popular broadcasters.

Figure 3:
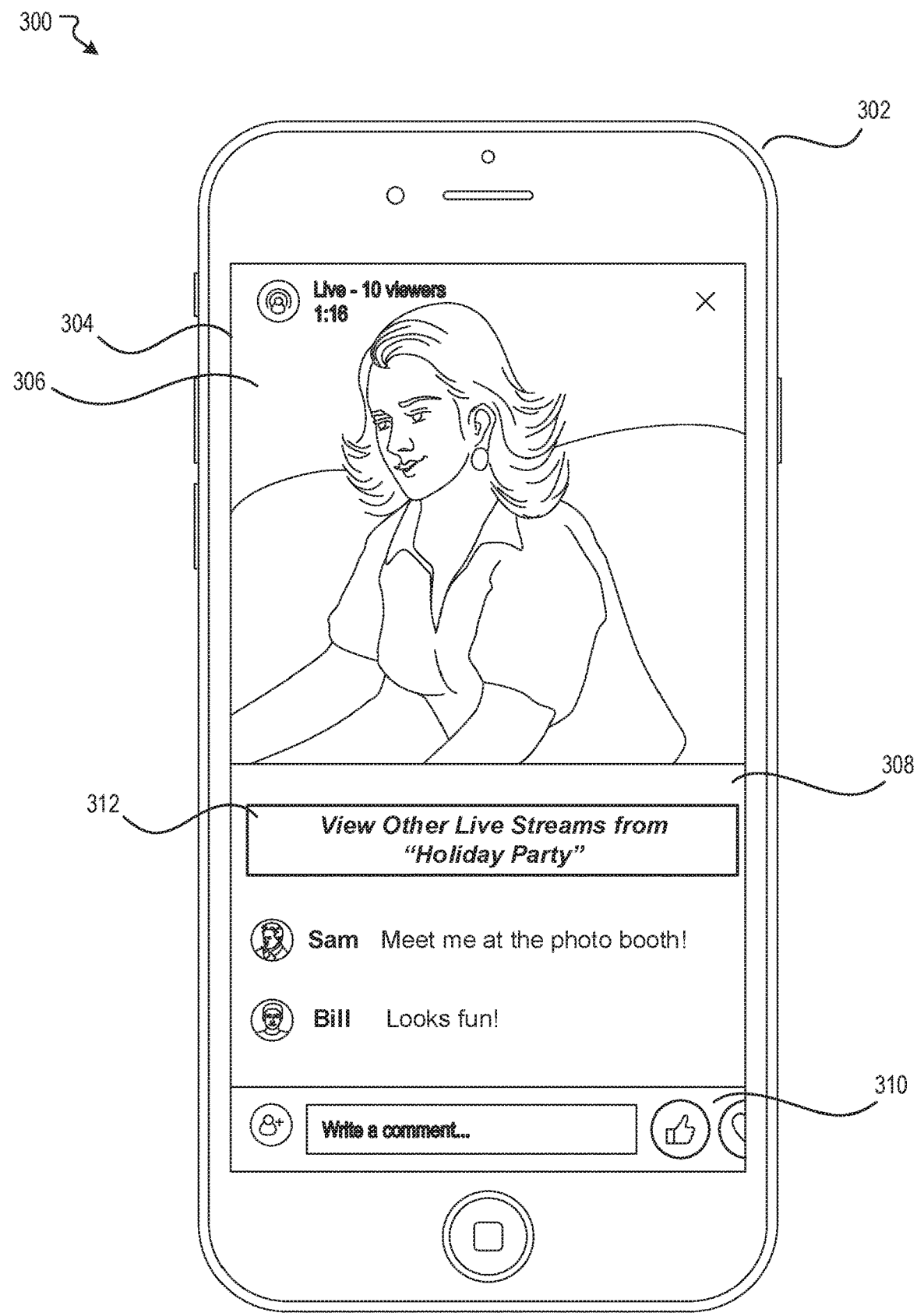
FIG. 3 illustrates an example interface, according to an embodiment of the present disclosure.
Figure 4:
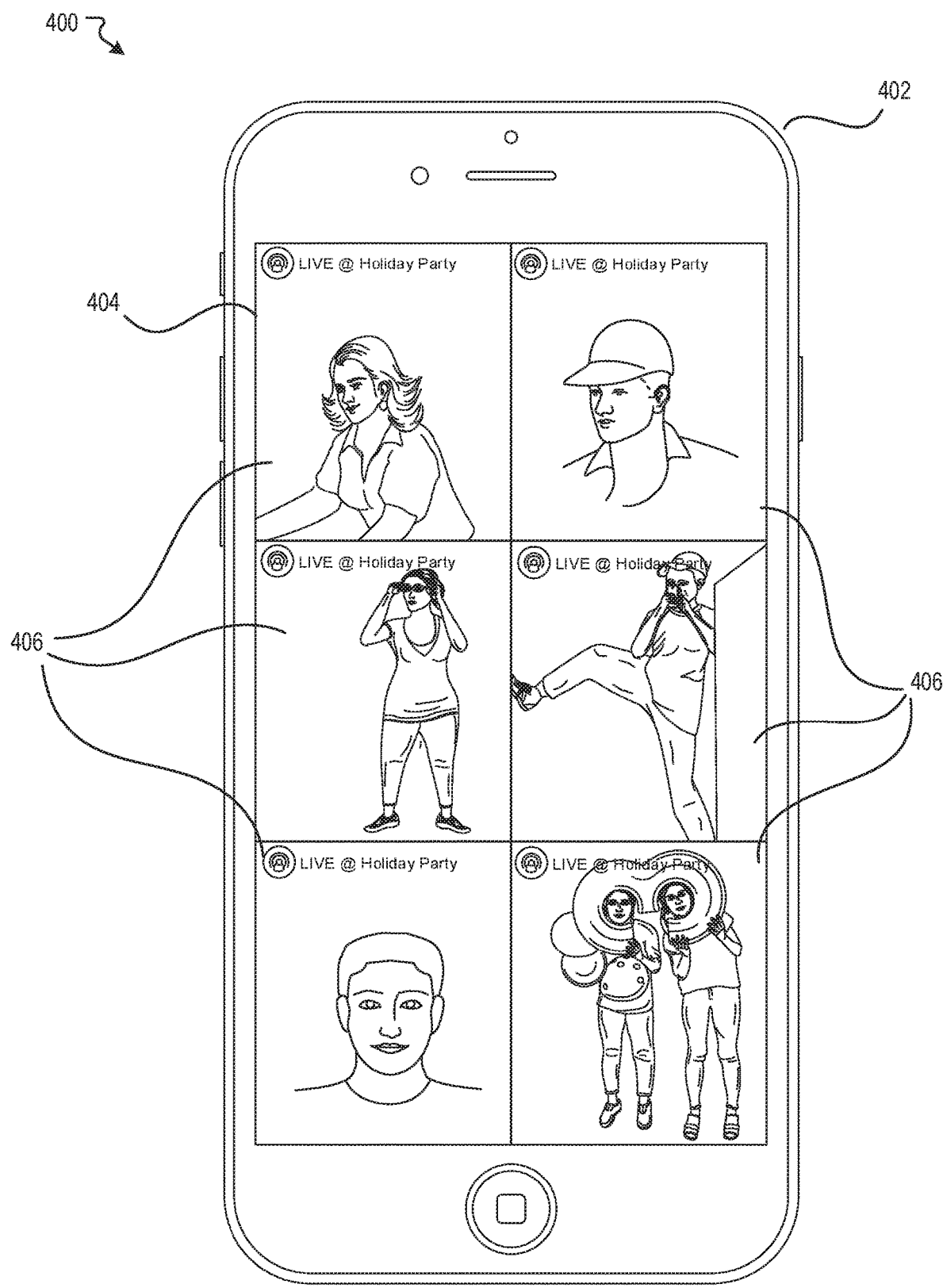
FIG. 4 illustrates another example interface, according to an embodiment of the present disclosure.

FIG. 3 illustrates an example 300 of an interface 304 for presenting a live content item, according to an embodiment of the present disclosure. The interface 304 is presented on a display screen of a computing device 302. The interface 304 may be provided through an application (e.g., a web browser, a social networking application, etc.) running on the computing device 302. In this example, the interface 304 includes a first region 306 in which the live content item is presented and a second region 308 in which various information relating to the live content item is presented (e.g., user comments, other social engagement metrics, etc.). In some embodiments, the live content item being presented through the interface 304 may be accessed through a news feed provided by a content provider (e.g., social networking system). In some embodiments, the second region 308 can also include various feedback options 310 for interacting with the broadcaster of the live content stream including, for example, a comment option, a like option, one or more reaction options (e.g., funny, happy, sad, angry, etc.), to name some examples. In some embodiments, the second region 308 includes an option 312 for accessing other live content items that relate to the live content item being presented, as illustrated in the example of FIG. 4. In some embodiments, the user operating the computing device 302 can access other related live content items by performing one or more touch screen gestures. For example, the user can perform a swipe gesture across a region of the display screen that corresponds to the first region 306. In response, another live content item that was determined to be related to the live content item being presented in the first region 306 can be shown.

FIG. 4 illustrates an example 400 of an interface 404 for presenting related live content items, according to an embodiment of the present disclosure. The interface 404 is presented on a display screen of a computing device 402. The interface 404 may be provided through an application (e.g., a web browser, a social networking application, etc.) running on the computing device 402. In this example, the interface 404 presents a content feed including a set of live content items 406 that were aggregated based on some relatedness criteria (e.g., shared geographic location, shared event, etc.), as described above. A user operating the computing device 402 can select any of the live content items 406 to view the live content item, as illustrated in the example of FIG. 3. In various embodiments, the content feed including the set of live content items 406 can continually be updated at various time intervals to add and/or remove live content items. For example, new live content items that are determined to be related to the set of live content items 406 can automatically be included in the content feed as part of the set of live content items 406. In another example, any live content items included in the set of live content items 406 that are no longer being broadcasted can automatically be removed from the content feed. As a result, the content feed provides users with access to various live content items that are related to one another and that are also actively being broadcasted through the content provider. In some embodiments, the set of related live content items 406 can also include one or more on-demand content items that were determined to be related. In such embodiments, these on-demand content items may correspond to live content items that were determined to be related to the live content items 406 but are no longer being broadcasted.

Figure 5:
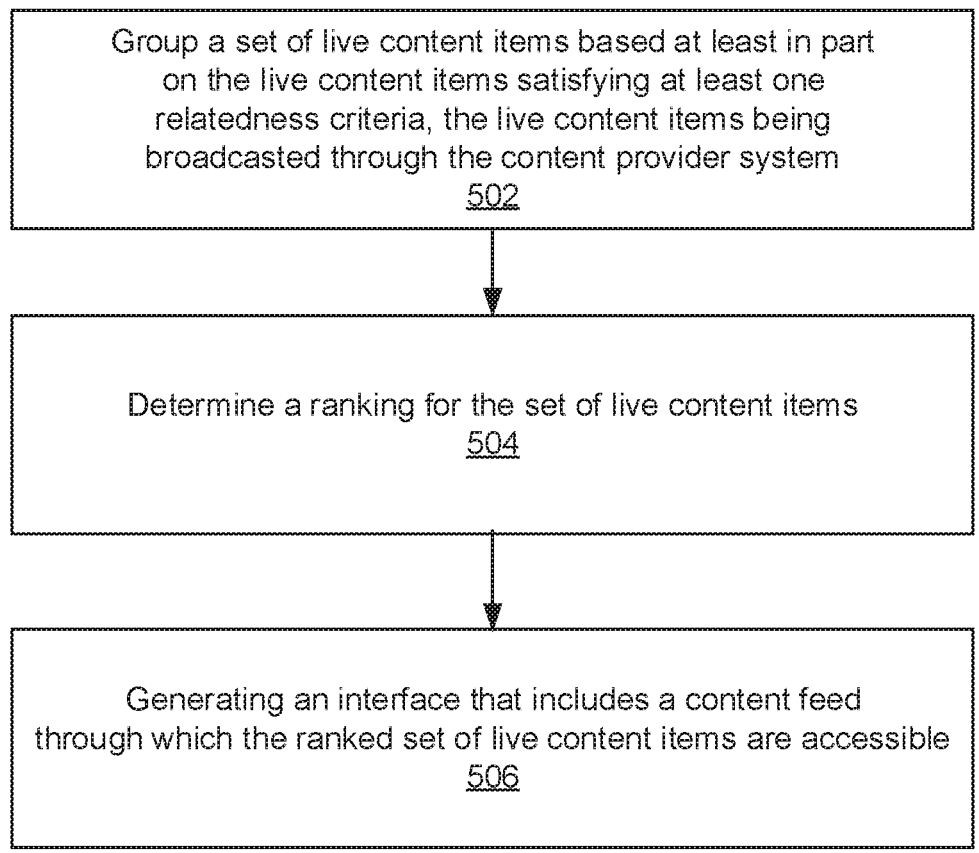
FIG. 5 illustrates an example process, according to various embodiments of the present disclosure.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, the example process 500 groups a set of live content items based at least in part on the live content items satisfying at least one relatedness criteria, the live content items being broadcasted through the content provider system. At block 504, live content items in the set of live content items are ranked. At block 506, an interface that includes a content feed through which the ranked set of live content items is accessible is generated.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
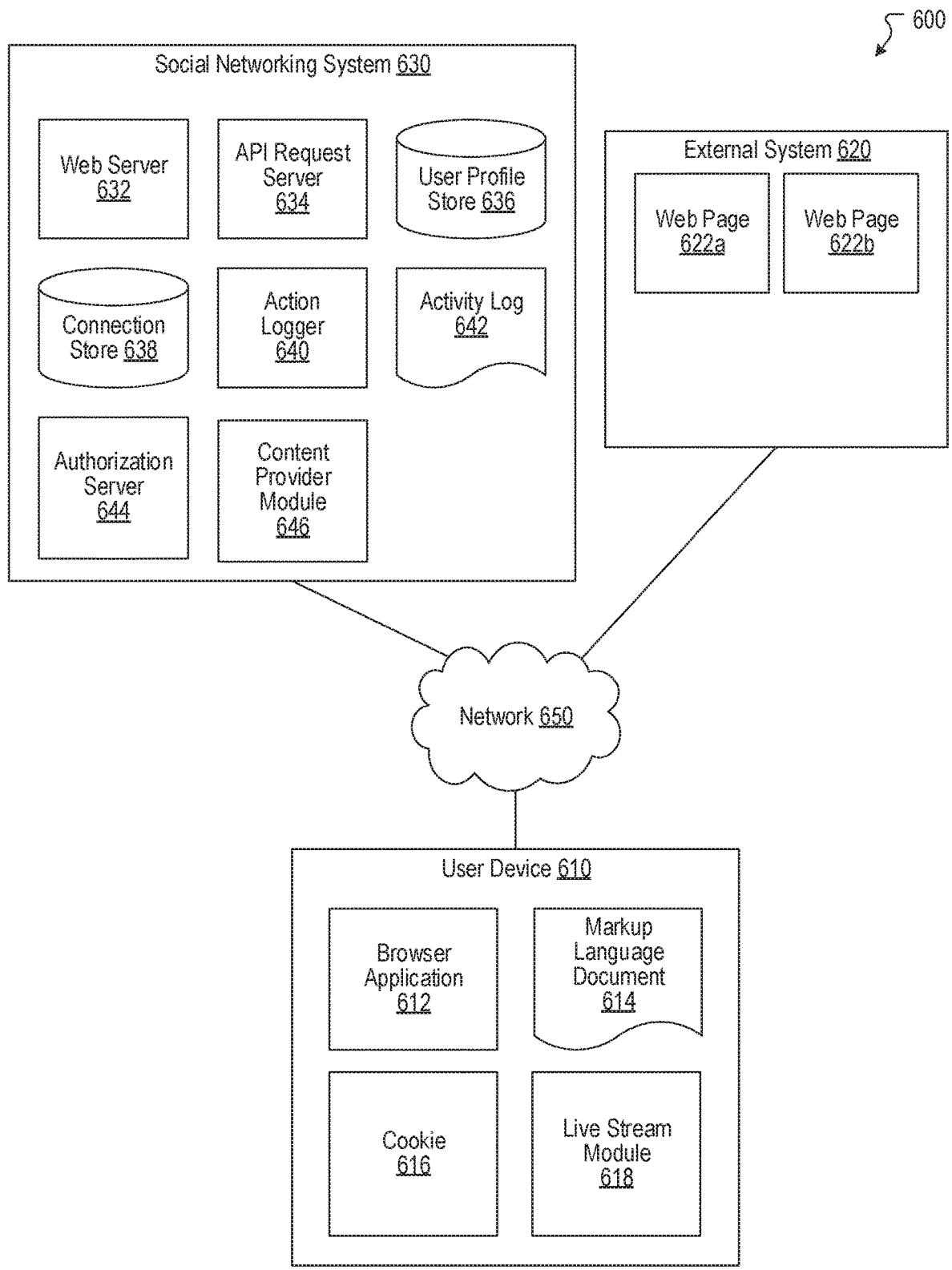
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the user device 610 can include a live stream module 618. The live stream module 618 can, for example, be implemented as the live stream module 106 of FIG. 1. As discussed previously, it should be appreciated that there can be many variations or other possibilities.

Hardware Implementation

Figure 7:
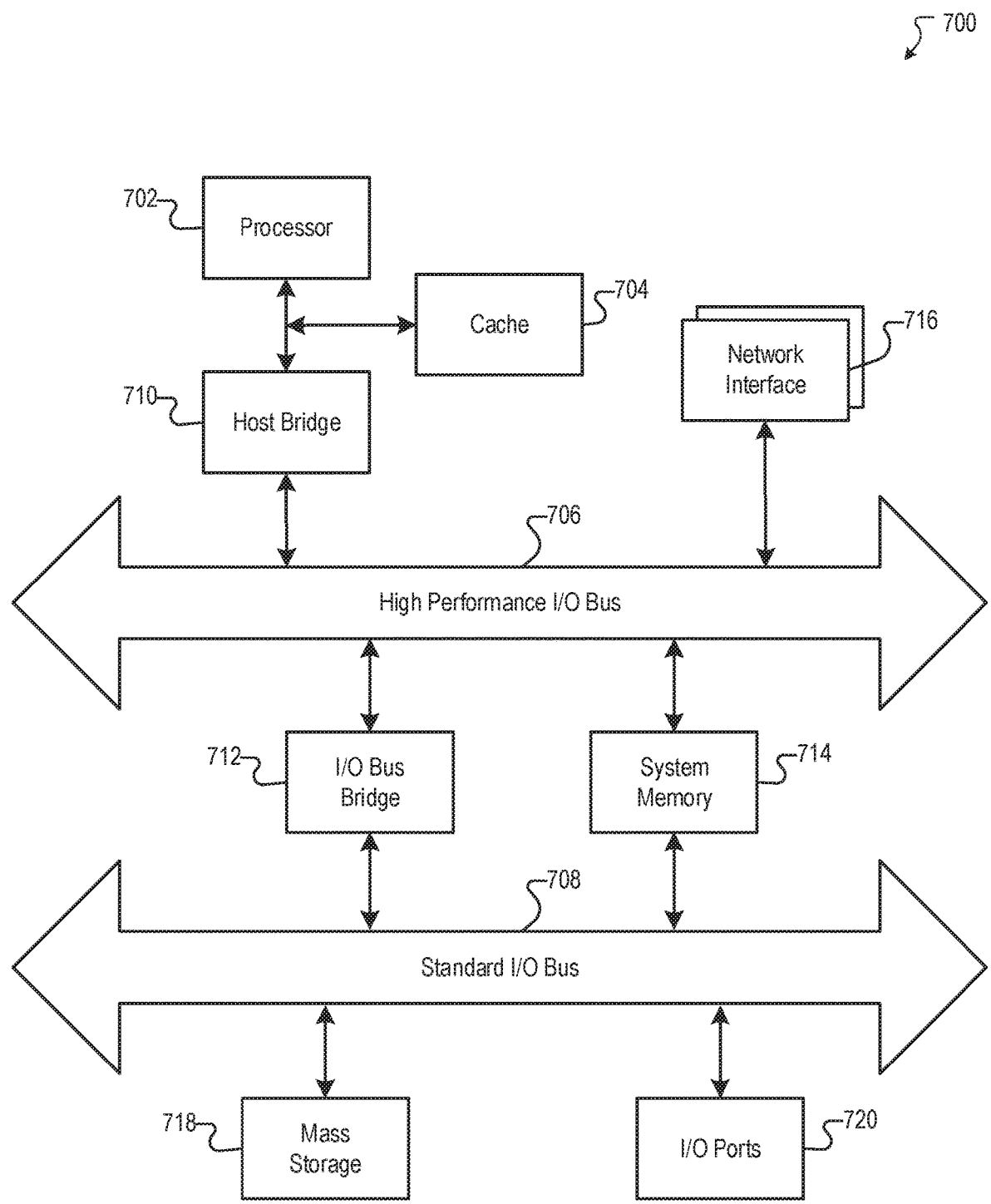
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a content provider system, a plurality of live content items provided by broadcasters, the plurality of live content items being broadcasted through the content provider system;
   determining, by the content provider system, at least some of the broadcasters indicated attendance at an event on the content provider system;
   grouping, by the content provider system, a set of live content items based at least in part on the live content items being associated with the at least some of the broadcasters and satisfying at least one relatedness criteria;
   determining, by the content provider system, a ranking for the set of live content items; and
   generating, by the content provider system, an interface that includes a content feed through which the ranked set of live content items are accessible.

2. The computer-implemented method of claim 1, wherein grouping the set of live content items being broadcast through the content provider system further comprises:
   determining, by the content provider system, live content items that are being broadcasted from a particular geographic location.

3. The computer-implemented method of claim 1, wherein grouping the set of live content items being broadcast through the content provider system further comprises:
   determining, by the content provider system, live content items that correspond to a particular event.

4. The computer-implemented method of claim 3, wherein the event was created through the content provider system.

5. The computer-implemented method of claim 4, wherein a live content item is determined to correspond to the event based at least in part on the live content item being broadcasted by a user that is attending the event.

6. The computer-implemented method of claim 1, wherein the set of live content items are ranked based at least in part on a respective number of social engagement signals received for the live content items from users of the content provider system.

7. The computer-implemented method of claim 6, wherein the number of social engagement signals for a live content item include at least a count of users viewing the live content item during its broadcast, a number of likes received for the live content item from, a number of reactions received for the live content item, a number of comments received for the live content item, or a number of times the live content item has been shared by users.

8. The computer-implemented method of claim 1, the method further comprising:
   determining, by the content provider system, that a first live content item in the content feed is no longer being broadcasted; and
   removing, by the content provider system, the first live content item from the content feed.

9. The computer-implemented method of claim 1, the method further comprising:
   determining, by the content provider system, that a new live content item being broadcasted satisfies the at least one relatedness criteria; and
   adding, by the content provider system, the new live content item to the content feed.

10. The computer-implemented method of claim 1, the method further comprising:
    providing, by the content provider system, the interface to a computing device of a user;
    determining, by the content provider system, that the user operating a computing device has accessed a first live content item in the content feed; and
    providing, by the content provider system, the first live content item broadcast to be presented on a display screen of the computing device.

11. A system comprising:
    at least one processor; and
    a memory storing instructions that, when executed by the at least one processor, cause the system to perform:
      receiving, by a content provider system, a plurality of live content items provided by broadcasters, the plurality of live content items being broadcasted through the content provider system;
      determining, by the content provider system, at least some of the broadcasters indicated attendance at an event on the content provider system;
      grouping, by the content provider system, a set of live content items based at least in part on the live content items being associated with the at least some of the broadcasters and satisfying at least one relatedness criteria;
      determining, by the content provider system, a ranking for the set of live content items; and
      generating, by the content provider system, an interface that includes a content feed through which the ranked set of live content items are accessible.

12. The system of claim 11, wherein grouping the set of live content items being broadcast through the content provider system further causes the system to perform:
    determining live content items that are being broadcasted from a particular geographic location.

13. The system of claim 11, wherein grouping the set of live content items being broadcast through the content provider system further causes the system to perform:
    determining live content items that correspond to a particular event.

14. The system of claim 13, wherein the event was created through the content provider system.

15. The system of claim 14, wherein a live content item is determined to correspond to the event based at least in part on the live content item being broadcasted by a user that is attending the event.

16. A non-transitory computer-readable storage medium including instructions that, when executed by at least one processor of a computing system, cause the computing system to perform a method comprising:

receiving, by a content provider system, a plurality of live content items provided by broadcasters, the plurality of live content items being broadcasted through the content provider system;

determining, by the content provider system, at least some of the broadcasters indicated attendance at an event on the content provider system;

grouping, by the content provider system, a set of live content items based at least in part on the live content items being associated with the at least some of the broadcasters and satisfying at least one relatedness criteria;

determining, by the content provider system, a ranking for the set of live content items; and generating, by the content provider system, an interface that includes a content feed through which the ranked set of live content items are accessible.

17. The non-transitory computer-readable storage medium of claim 16, wherein grouping the set of live content items being broadcast through the content provider system further causes the computing system to perform:

determining live content items that are being broadcasted from a particular geographic location.

18. The non-transitory computer-readable storage medium of claim 16, wherein grouping the set of live content items being broadcast through the content provider system further causes the computing system to perform:

determining live content items that correspond to a particular event.

19. The non-transitory computer-readable storage medium of claim 18, wherein the event was created through the content provider system.

20. The non-transitory computer-readable storage medium of claim 19, wherein a live content item is determined to correspond to the event based at least in part on the live content item being broadcasted by a user that is attending the event.

* * * * *